Aug. 18, 1964 M. SWETLITZ 3,145,289
COOKING OVENS PROVIDED WITH REMOVABLE WALL PANELS
Filed April 20, 1962 2 Sheets-Sheet 1

INVENTOR.
MYRON SWETLITZ
BY
ATTORNEY

United States Patent Office 3,145,289
Patented Aug. 18, 1964

3,145,289
COOKING OVENS PROVIDED WITH REMOVABLE
WALL PANELS
Myron Swetlitz, Skokie, Ill., assignor to General Electric
Company, a corporation of New York
Filed Apr. 20, 1962, Ser. No. 189,006
10 Claims. (Cl. 219—395)

This invention relates to cooking ovens, and in particular to a cooking oven having a system of removable wall panels which facilitate the cleaning of the oven and reduce the temperature of the side and rear walls of the oven.

It is common knowledge that the walls of cooking ovens receive splatters of grease and proteinaceous matter when meats are being roasted or broiled, and that these materials "burn on" and become extremely difficult to remove. Cleaning the walls of a conventional oven is a bothersome chore even if undertaken immediately after the cooking operations; it becomes an exceedingly difficult task if one waits until after several periods of use of the oven, for it has been found that the tenacity of the adherence of the soil to the wall is a time as well as a temperature function. Certain contemporary electric ranges have provided for draping conventional kitchen aluminum foil at the sides, bottom and rear walls of domestic cooking ovens for the obvious purpose of providing a disposable liner which may be thrown away when it becomes soiled. Experience has shown, however, that the exceedingly thin foil is difficult to apply, and that after one or two experiences the housewife abandons this mechanism.

It also has been proposed, but never commercially practiced so far as applicant is aware, to provide removable panels which are slid into place and form a protective cover for the side and rear walls of an oven. The application of such panels requires the provision of mounting or guiding tracks or grooves at the bottom and top of the oven. However, applicant considers that the panels themselves in such an arrangement would be difficult to clean because of their size and unhandiness, and that the grooves themselves would accumulate food soil and thus present a cleaning problem.

The present invention provides a unique arrangement of individual panels for the sides, bottom and rear oven walls and a mounting and supporting system which not only makes the panels easy to remove for cleaning at the kitchen sink, but reduces the heat conduction from the oven walls to the panels, and thus maintains the panels much cooler than the fixed walls of a conventional oven. This latter aspect is important for several reasons: a cooler wall panel delays the "burning on" action of protein soils and makes it far easier to clean the panels even after prolonged exposure; the cool walls actually reduce the overshoot of the temperature of the oven air as the oven is being heated to a desired cooking temperature level; and the maximum temperature after prolonged high temperature cooking operations is such that in lieu of chromium plating, the panels may be coated with "Teflon" or other organic soil-resisting material. For example, actual tests have indicated that with an oven thermostat set to maintain 475° F. within the oven, the oven air will reach about 535° F. before the thermostat starts to cycle the heating units to maintain the desired temperature. A conventional oven having the usual fixed vitreous enamel coated walls will show side wall temperatures which rise to over 600° F. and it has been shown that these walls lose their temperature slowly, and actually never decline to the control temperature of the oven. It is believed that this temperature excess is due to the fact that the bottom and top walls get very hot, and the heat is transmitted by direct conduction to the side and rear walls. These wall conditions provide a thermal mass which detracts from the performance of the thermostat. In contrast to fixed wall performance, removable oven walls arranged according to the present invention do not attain a temperature above the thermostat setting point, and show an average temperature, as the thermostat cycles the heating units of the oven to stabilizer the oven temperature close to the thermostat control point, which is substantially that of the temperature of the oven air. In the comparative tests which demonstrated these temperature conditions, each oven was of the electrically heated, domestic type; the fixed wall oven has a light colored vitreous enamel wall finish, and the removable panel oven was equipped with panels of chromium-plated sheet steel approximately .035 inch thick.

It is therefore an object of the invention to provide a cooking appliance having removable wall panels which are easily cleaned and replaced and during the operation of the oven, are at a substantially lower temperature than the fixed wall structures of conventional ovens.

I consider that the arrangement of the several panels in a manner which reduces heat conduction from one to the other to a degree amounting almost to the point of elimination of heat conduction, and provision of means whereby the heat emission from the bottom and top heating units of the oven is "focused" toward the central air space of the oven, are prime contributors to the improved oven performance.

In a presently preferred arrangement, for example, the removable panel of the bottom of the oven has a rectangular depression defined by angularly sloping marginal walls and flat walls extending outwardly therefrom; the outer edges of the flat walls have a flange of about ⅛ inch depth, the edges of which provide the only area of contact of the bottom panel with the bottom wall of the oven structure. The electrical resistance heating elements at the bottom of the oven are located in this rectangular depression and are below the plane defined by the outwardly extending flat walls.

The top wall of the oven has a similar rectangular depression within which are located the heating elements of the upper heating unit; said top wall is fixed but is shielded from the heating unit by an intermediate reflector plate spaced about one half inch from the wall.

The rear wall panel is substantially rectangular but of a height less than the oven cavity and may be provided with relatively deep side wall flanges whereby the face of the panel is spaced about ½ inch forward of the fixed rear wall structure of the oven. At its base this rear panel may have a flat step which is at the level of and coextensive with the rear flat wall of the bottom panel; said step has marginal flanges which provide a principal support for the rear wall. For ovens in excess of 18 inches in width, it is preferable to have two rear panels in side-by-side relation.

The respective side walls are rectangular and of less height than the oven cavity, as defined by the fixed walls thereof. The side walls are bounded by a rearwardly turned narrow flange. The side walls rest on this bottom flange, laterally of the adjacent flange of the bottom panel. The side walls are therefore only in the most casual contact with the adjacent bottom panel. The vertical flange at the rear of each side panel confronts the face of the rear panel adjacent its sides; the side panels therefore contribute in some measure to the support of the rear panel but not in any sense of being firmly in contact therewith.

The entire wall structure is maintained in position primarily by a shelf rack in front of each side panel. These are wire racks which have a plurality of vertically spaced horizontal rails for the accommodation of oven shelves or baking pans. I provide an upright at the front and the rear of each of the racks, the upper ends of each upright removably extending into apertures at the front and rear of the top wall of the oven. The lower end of the front upright passes through an aperture in the flat side wall of the bottom panel, and the lower end of the rear upright passes through an aperture at the side edge of the step of the rear panel. The vertical uprights are, at best, only in line contact with the side panels, and while affording primary support for such panels do so without substantial heat conduction therebetween.

Other features and advantages of the invention will be understood from the following description of a presently preferred embodiment read in connection with the accompanying drawings in which.

Figure 1:
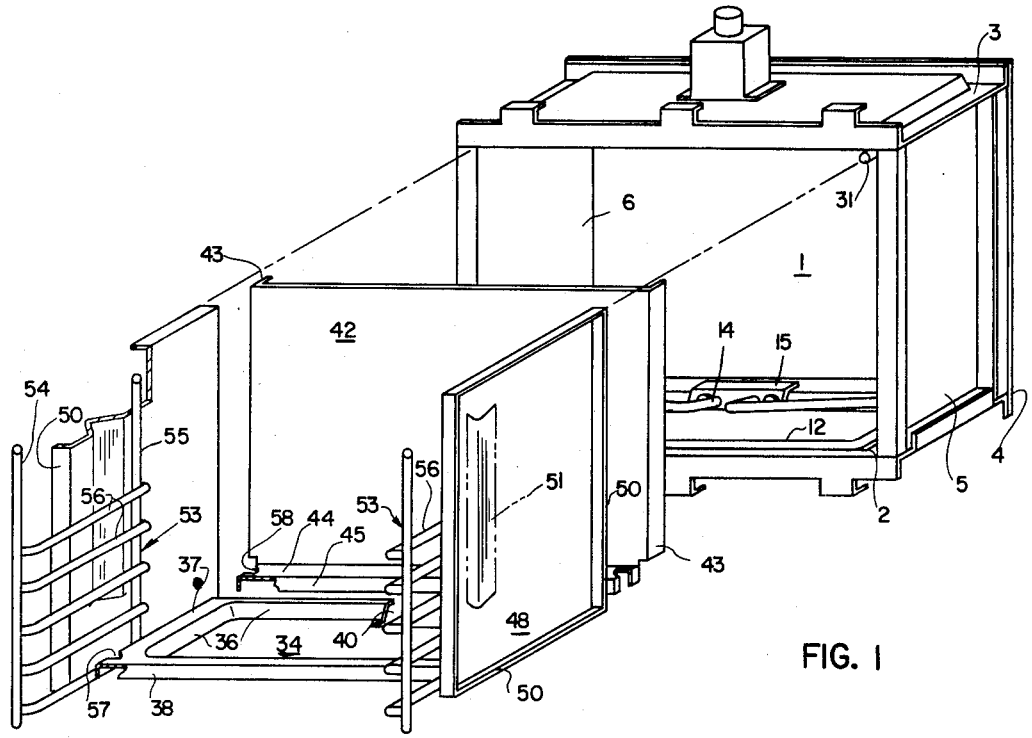
FIG. 1 is an exploded perspective showing the basic oven cavity (without door or insulation) with the several removable panels in their proper relationship.

In FIG. 1 a basic oven structure 1 comprises a five-sided chamber constructed by fastening together a suitable arrangement of sheet metal walls. Advantageously, these walls may be of sheet steel having an least the surface facing the interior of the chamber provided with an aluminum coating. Specifically, the oven structure includes a base wall 2, a top wall 3, a back wall 4, and the side walls 5 and 6. Any appropriate method of securing the panels one to the other may be employed; welding appears to be the preferred method. The illustrated flange-provided formation of the several panels is presently preferred, but is not to be viewed in any limiting sense. It will be understood that this basic oven structure is adaptable for inclusion in domestic cooking ranges of all types or may be completed as a separate oven for use as a built-in "wall" oven as well known in the art. Of course, suitable thermal insulation (not shown) is applied to the exterior, and a door 7 is provided. In modern oven constructions the door is usually hinged adjacent its bottom to assume a substantially horizontal position when open. In such position the upwardly facing wall of the oven will be substantially coplanar with the bottom wall 2 of the oven cavity. In view of the fact that the type and structure of the oven door or its specific method of hinging are not important to the present invention, the door 7 has been shown in broken line to represent a door in its generic sense.

Figure 2:
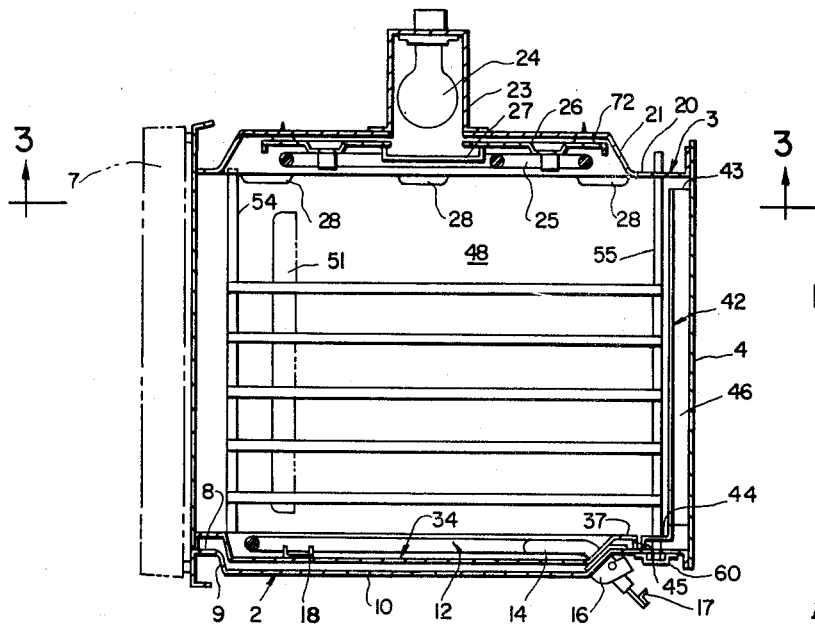
FIG. 2 is a side sectional elevation of the oven with the panels and shelf supporting rack in assembled positions.

Referring to FIG. 2, it will be seen that both the lower wall 2 and the upper wall 3 are dished, and in each case this formation provides a substantially rectangular depression accommodating one or more of the heating units used in baking and broiling operations. The bottom wall 2 has a substantially flat peripheral wall 8, inwardly sloping walls 9, and a flat bottom wall 10. The recessed central area defined thereby encompasses a resistance heating element 12 of the familiar tubular sheathed type; said element is arranged about the base of the sloping walls 9. The terminal portions 14 are secured to a mounting plate 15, FIG. 1. Behind the sloping wall at the rear of plate 2 there is mounted a terminal block 16 accommodating electrical terminals (not shown) with which cooperate blade-like terminals (not shown) of the heating unit. The exposed terminals 17 of the block 16 receive the power leads (not shown) of a 230 volt, three-wire alternating current power system as well known in the art. The actual arrangement of the heating element 12 as respects its connection to the terminal block and the power leads is of importance only in that the heating element should be removable, or hinged so that it may be swung upwardly, as later explained. Each of these methods of connection is well known; the removable type is exemplified in U.S. Patent 2,762,899, granted September 11, 1956 to H. J. Lenz, and the hinged type is shown in Ammerman U.S. Patent 2,824,944, granted February 25, 1958. Near the front of each of the side wall runs of the heating element, a channel 18 or other suitable support is affixed.

The top wall 3 is quite similar to the base wall 2 in that it comprises a flat peripheral wall 20, a sloping wall 21, and the flat central wall 22. The central wall area may have an opening bounded by a lamp housing 23 which accommodates an incandescent electric bulb 24. The upper heating unit 25 is also of the tubular sheathed type, but is sinuously configured to supply heat over a large area rather than peripherally, as is the situation with heating element 12. This upper heating element is used at full wattage during broiling operations. During baking or roasting operations the lower element is used at full wattage and the upper element at quarter wattage. In a conventional domestic oven the rating of each element may be of the order of 3,000 watts maximum. The heating unit 25 is clipped or otherwise secured to a reflector sheet 26 of polished metal; said sheet is provided with a heat resistant glass window 27 whereby the interior of the oven is illuminated by the lamp 24. The reflector sheet is fastened to the top wall by means of sheet metal screws or the like, arranged to space the reflector sheet about one half inch below the top wall. Also, the top wall 3 has adjacent each of the side walls, embosses 28. The heating unit 25 has a terminal block 30, FIG. 3; it is not customary to have the upper heating unit removable or hinged.

The respective concave portions of the upper and lower walls act in substantial measure to focus the emitted heat energy into the oven space.

Figure 3:
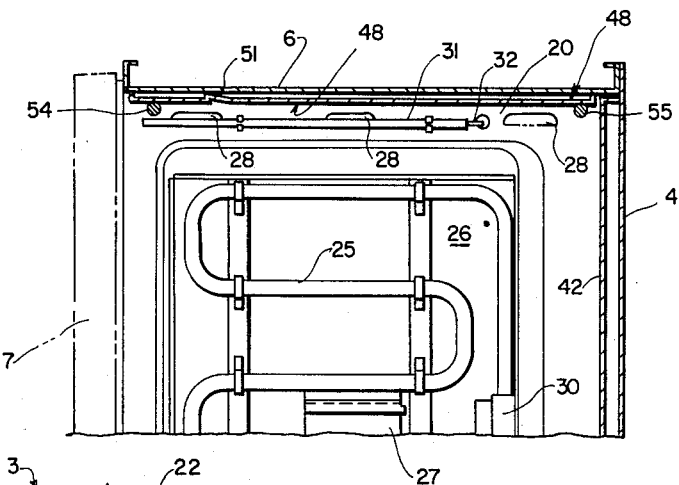
FIG. 3 is a top view of one half of the oven cavity, looking in the direction of the arrows 3—3 of FIG. 2.

As indicated in FIG. 3, a temperature sensitive bulb 31 of a conventional thermostat (not shown) is secured immediately below one of the horizontal wall portions 20 of the upper wall structure; a "capillary" tube 32 of the thermostat enters through a suitable opening in said wall.

Pursuant to the invention, the bottom, rear and side walls of the oven structure are equipped with rigid, removable panels arranged to have minimum heat conductive contact with the adjacent fixed oven walls or adjacent panels. By "rigid" panels I mean panels of sufficient strength that they may be removed from the oven, taken to the kitchen sink for washing or scouring, and replaced in the oven without danger of distortion or bending. In the present embodiment panels are of sheet steel .035 inch thick. With respect to the side and rear panels, the surfaces thereof facing the interior of the oven may have a bright chromium-plated finish, as does the surface of the bottom panel. However, because of advantageous factors presently described, the side and rear panels are at all times sufficiently cool to permit the inwardly facing surfaces thereof to be coated with the polytetrafluoroethylene resin marketed under the trademark "Teflon." It is now well known that "Teflon" coated cooking utensils do not permit the adherence of fats or like materials.

Figure 4:
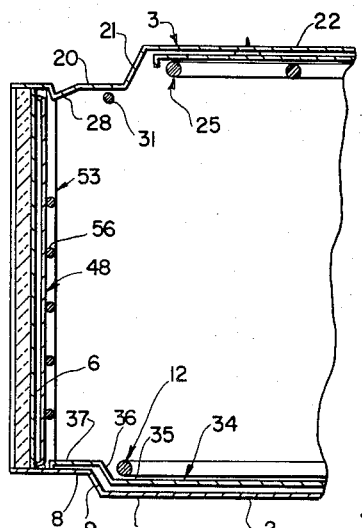
FIG. 4 is a somewhat schematic front elevational section of the left hand portion of the oven.

The bottom panel 34 has a shape similar to that of the bottom wall 2 of the basic oven structure; it is dished to provide a rectangular portion characterized by the plane central portion or bottom wall 35, the sloping side walls 36, and the horizontally outwardly extending marginal portion or peripheral walls 37. The bottom panel is supported on the bottom wall 2 only at its outermost edges; specifically, said support is the downwardly extending flange 38 shown best in FIG. 1. This flange is of the order of ⅛ inch in height, and may be continuous or discontinuous, as desired. As best shown in FIG. 4, this outer edge arrangement supports the bottom panel on the horizontal wall portions of the bottom wall 2, thereby maintaining the bottom panel 34 out of contact with the oven base wall, except at the raw edges of the flanges. A rear wall portion of panel 34 is cut away, as at 40, FIG. 1, to accommodate the terminal area of the heating unit 12.

The rear panel 42 is a plane surfaced member having a flange 43 at each side margin and a horizontal base or ledge 44 which in turn has a downwardly extending flange 45. The flanges 43 are relatively wide—for example, ½ inch—and with the back wall 4 of the oven structure, define a passage 46 which is available as an air flow passage when the oven is equipped with a ventilating system (not shown). In view of this, the panel 42 terminates short of the upper wall 3 of the oven structure, as indicated in FIG. 2. It will be noted that the base or ledge 44 is coplanar with the adjacent horizontal wall 37 of the bottom panel 34, and forms a continuation thereof. The bottom edge of flange 45 provides the main support structure for the panel 42.

Each side panel 48 is identical. It is an essentially plane wall element, the peripheral edge of which is defined by the marginal flange 50. The provision of a flange 50 about the four sides of the panel 48 is essentially for appearance, for the flanges at the front and rear edges of the panel are the important ones, in that they maintain the major part of the panel spaced from the side wall. The side panels rest upon their bottom flange. It will be understood that in the mass production of these panels, the flanges will not be precisely square to the panel, and there will not be even the ⅛ inch width of the flange in contact with the wall portion 8. Actually, as suggested somewhat exaggeratedly in FIG. 4, the panel 48 will be only in edge contact therewith. Each panel may have the vertical emboss 51, which provides a finger grip for sliding the panels forwardly.

In position, the panels are outwardly of the embosses 28. The principal support for the panels, however, comprise the shelf support racks 53 removably placed in front of each of the side panels. Each support includes the upright members 54 and 55 respectively at the front and rear, and a plurality of rails 56 which slidably accommodate oven shelves or baking sheets (not shown). At each side wall the front rack supports 54 extend through a notch 57 in the respective front corner portions of the bottom panel 34; the rear rack supports 56 pass through a notch 58 at the side of the rear panel foot 44. As indicated in FIG. 2, channel-shaped fixture 60 receives the end of the respective supports. At the top of the oven structure the supports pass loosely through suitable openings in the top wall 3. As best shown in FIG. 3, the supports 54 and 55, being circular in cross-section, have only line contact with the side panels 48.

These shelf supports are readily removable, and upon removal release the panels for disassembly. The side panels 48 will be held upright by the embosses 28 after the removal of the oven racks, and may then be drawn forwardly through the open door. The rear panel 42 is then available for removal. It will be noted that the fixed upper heating unit 25 is well above the top of the panel 42, and therefore does not interfere with the removal of the rear panel. Then, after first removing the lower heating element 12, or swinging it upwardly if it is of the hinged type, the bottom panel is available for removal. After cleaning the panels they are easily returned in reverse order of their removal.

The essentially edge contact of the respective panels with the adjacent fixed walls of the oven and the very casual interfitting relationship of the panels with each other, greatly reduce the heat transfer from the fixed oven walls to the removable wall panels. In addition, the removable wall panels insulate the fixed oven walls from radiant heat, and it is practicable to reduce the usual thickness of oven wall insulation while remaining fully within the temperature limitations established by the Underwriters Laboratories, Inc.

Figure 5:
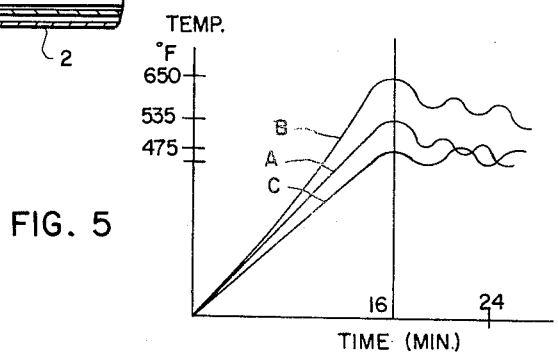
FIG. 5 is a composition of temperature curves showing the relationship of wall temperatures to oven air temperature for a conventional fixed wall oven and an oven embodying the present invention.

A performance advantage gained by using removable oven wall panels according to this invention is illustrated by the temperature curves of FIG. 5 which represent oven thermostat performance at wall temperatures in the use of the oven for baking muffins. The thermostat setting was 475° F.; curve A typifies the oven temperature rise from a cold start to the point at which the first cycling of the thermostat occurred. Curve B is representative of the temperature of a side wall panel of a conventional fixed wall oven; said panel had a light gray ceramic finish. Curve C is representative of a side wall panel 48 of the present invention. The temperature readings from which curves B and C were plotted were taken at identical locations on the respective panels.

Curve A shows that the first cycling of the thermostat occurred 16 minutes after the energization of the heating elements, and because of the usual "overshoot" which occurs in range ovens, the first cycling of the thermostat occurred when the oven air temperature reached approximately 535° F. The conventional oven wall panel, however, probably because of the close proximity of the oven heating units to the bottom and top walls of the oven, and the heat conduction from these walls to the side panel, reached more than 650° F. The removable side wall panel reached only 475° F. As the thermostat commenced its periodic cycling the oven temperature reached a substantially steady state condition of 463° F., and the removable oven wall had a closely corresponding temperature. It is believed that this is an indication that the removable oven wall panel was being heated mainly by heat transfer from the air in the oven and not by conduction from the substantially higher temperature walls or panels directly below and above the heating units. On the other hand, the fixed oven wall always remained at a temperature close to 550° F. Summarizing, it will be noted that the fixed wall attained a temperature of about 150° F. greater than the removable wall panel and remained in a steady state condition which was from 75° F. to 100° F. more than the removable wall panel.

These temperature differences have a substantial effect on cleanability as well as on oven performance. It is known that at really high wall temperatures, that is, temperatures of the order of 850° F. to 950° F., the oven wall will actually "burn clean." At lesser temperatures, however, and particularly temperatures in the 525° F. to 550° F. range, the soil will carbonize into an extremely tenacious deposit. At temperatures substantially below 500° F., the soil deposit is far less tenacious, and the wall panels can be cleansed with the usual kitchen detergents.

While there has been described what is at present thought to be the preferred embodiment of the invention, it will be understood that various modifications may be made therein and it is intended to cover in the appended claims all such modifications as fall within the true spirit and scope of the invention.

I claim:

1. In a cooking oven comprising fixed box-like structure including top and bottom and rear walls and a pair of side walls and having a front access doorway thereinto, the combination of: a pair of removable rectangular side panels respectively substantially coextensive in area with said side walls; a removable rectangular bottom panel substantially coextensive in area with said bottom wall; a removable rectangular rear panel substantially coextensive in area with said rear wall; each of said panels having peripheral flange means for maintaining substantially the entire area thereof spaced from the adjacent one of said walls; each of said panels being of rigid metal to be self-supporting and capable of being washed or otherwise cleaned without distortion upon removal thereof from the oven; said bottom panel having a dished central portion and a marginal portion extending horizontally outwardly thereabout; said rear panel having a ledge at the base thereof abutting the adjacent horizontally extending marginal portion of said bottom panel to comprise a continuation thereof; said side panels being disposed immediately outwardly of and in confronting relation to the respective side flanges of said bottom panel and being in confronting relation to the respective side edges of said rear panel; and a pair of racks respectively adjacent to said side panels, each of said racks having vertical front and rear elements both engaging the adjacent one of said side panels to support the same, the upper ends of said elements removably entering apertures in said top wall and the lower ends of said elements removably entering apertures respectively in the outwardly extending marginal portion of said bottom panel at the sides thereof and in the abutting ledge of said rear panel at the sides thereof, said racks having longitudinally extending rails for the support of shelves or the like for foodstuffs being cooked in the oven.

2. The combination according to claim 1, in which said side panels and said rear panels have surfaces facing into the oven that carry finishes of bright and reflective character.

3. The combination according to claim 1, in which said side panels and said rear panel have surfaces facing into the oven that carry coatings of polytetrafluoroethylene.

4. In a cooking oven comprising fixed box-like structure including top and bottom and rear walls and a pair of side walls and having a front access doorway thereinto, the combination of: a pair of removable rectangular side panels respectively substantially coextensive in area with said side walls; a removable rectangular bottom panel substantially coextensive in area with said bottom wall; a removable rectangular rear panel substantially coextensive in area with said rear wall; each of said panels having flange means for maintaining substantially the entire area thereof spaced from the adjacent one of said walls; each of said panels being of rigid metal to be self-supporting and capable of being washed or otherwise cleaned without distortion upon removal thereof from the oven; said bottom panel having a dished central portion and a marginal portion extending horizontally rearwardly therefrom; said rear panel having a ledge at the base thereof abutting the adjacent horizontally extending marginal portion of said bottom panel to comprise a continuation thereof; said side panels being disposed immediately outwardly of and in confronting relation to the respective side flanges of said bottom panel and being in confronting relation to the respective side edges of said rear panel; a heating unit within the dished central portion of said bottom panel; and means including upstanding pairs of front and rear posts respectively engaging said side panels in line contact relationship therewith for supporting the same, the upper ends of said front and rear posts removably entering apertures in said top wall and the lower ends of said posts removably entering apertures respectively in the outwardly extending marginal portion of said bottom panel at the sides thereof and in the abutting ledge of said rear panel at the sides thereof.

5. A cooking oven comprising, in combination: fixed box-like structure including top and bottom and rear walls and a pair of side walls and having a front access doorway thereinto; a pair of removable rectangular side panels respectively substantially coextensive in area with said side walls; a removable rectangular bottom panel substantially coextensive in area with said bottom wall; a removable rectangular rear panel substantially coextensive in area with said rear wall; each of said panels having peripheral edge portions for supporting the same relative to the adjacent one of said walls, said edge portions providing the sole contacts between said panels and the respective ones of said walls; each of said panels being of rigid metal to be self-supporting and capable of being removed from the oven without distortion; said bottom panel having a dished central portion and a marginal portion extending horizontally outwardly thereabout; said rear panel having a forwardly extending ledge at the base thereof; said side panels being disposed immediately outwardly of and in confronting relation to the respective side flanges of said bottom panel and being in confronting relation to the respective side edges of said rear panel; a heating unit within the dished central portion of said bottom panel; and a pair of racks respectively adjacent to said side panels, each of said racks having vertical front and rear elements both engaging the adjacent one of said side panels to support the same, the upper ends of said elements removably entering apertures in said top wall and the lower ends of said elements removably entering apertures respectively in the outwardly extending marginal portion of said bottom panel at the sides thereof and in the abutting ledge of said rear panel at the sides thereof, said racks having longitudinally extending rails for the support of shelves or the like for foodstuffs being cooked in the oven.

6. The combination according to claim 5, and further comprising means for supporting said heating unit on said bottom panel and for limiting heat conduction therebetween.

7. A cooking oven comprising, in combination: fixed box-like structure including top and bottom and rear walls and a pair of side walls and having a front access doorway thereinto, said walls being joined one to the other in heat conductive relation; a pair of removable rectangular side panels respectively substantially coextensive with said side walls; a removable rectangular rear panel substantially coextensive with said rear wall; each of said side and rear panels having bottom edge portions respectively supporting the same on said bottom wall and other edge portions maintaining the major parts thereof spaced from the respectively adjacent ones of said side and rear walls, and each of said side and rear panels having top edge portions respectively terminating short of said top wall; a removable rectangular bottom panel on said bottom wall, said bottom panel being wholly within the area bounded by said side and rear panels and having support means whereby the major part of said bottom panel is spaced from said bottom wall; resistance heater means disposed in overlying spaced relation to said bottom panel and disposed below the bottom edge portions of said side and rear panels; and means including four upstanding rod-like structures respectively disposed at the fronts and at the rears of said side panels for maintaining said side panels in upright positions, each of said structures removably entering a cooperating aperture in said top wall.

8. The combination according to claim 7, in which a rear edge portion of each of said side panels is in close confronting relation to a corresponding side of said rear panel, whereby to assist in maintaining said rear panel in upright position.

9. A cooking oven comprising, in combination: fixed box-like structure including top and bottom and rear walls and a pair of side walls and having a front access doorway thereinto, said walls being joined one to the other in heat conductive relation; a pair of removable rectangular side panels respectively substantially coextensive with said side walls; a removable rectangular rear panel substantially coextensive with said rear wall; each of said side and rear panels having edge portions supporting the same on said bottom wall and maintaining the major parts thereof spaced from the respectively adjacent ones of said side and rear walls, and each of said side and rear panels having top edge portions respectively terminating short of said top wall; a removable rectangular bottom panel on said bottom wall, said bottom panel being wholly within the area bounded by said side and rear panels and having support means whereby the major part of said bottom panel is spaced from said bottom wall; a first resistance heater disposed in overlying spaced relation to said bottom panel and disposed below the bottom edge portions of said side and rear panels; a reflector; means mounting said reflector adjacent to said top wall and establishing an air space therebetween; a second resistance heater affixed to said reflector and openly facing into the oven and positioned in a substantially horizontal plane arranged above the tops of said side and rear panels; and means including four upstanding rod-like structures respectively disposed at the fronts and at the rears of said side panels for maintaining said side panels in upright positions, each of said structures removably entering a cooperating aperture in said top wall.

10. A cooking oven comprising in combintion: fixed box-like structure including top and bottom and rear walls and a pair of side walls and defining an oven cavity having a front access doorway thereinto, said walls being joined one to the other in heat-conductive relation; a pair of side panels removably supported in said oven caivty in operative positions respectively cooperating with said side walls, each one of said side panels having an area substantially commensurate with that of the cooperating one of said side walls and each one of said side panels in its operative position being spaced inwardly of and closely adjacent to the cooperating one of said side walls, the principal area of each one of said side panels in its operative position also being disposed out of direct contact with the cooperating one of said side walls; and means for selectively retaining said side panels in place in their respective operative positions and for accommodating ready and quick removal thereof to the exterior of said oven cavity for cleaning; wherein each one of said side panels essentially comprises a rigid self-supporting metal body sheet, and a resinous coating tenaciously adhered to the side of said body sheet that is presented to said oven cavity when said one side panel occupies its operative position; and wherein each one of said coatings consists essentially of polytetrafluoroethylene, whereby each one of said coatings is highly impervious to moisture and substantially completely impervious to grease and to other environmental elements of said oven cavity, and whereby the exposed surface of each one of said coatings is characterized by ready cleaning with wash water contaniing a simple detergent.

References Cited in the file of this patent
UNITED STATES PATENTS

| | | |
|---|---|---|
| 2,537,433 | Waring | Jan. 9, 1951 |
| 2,562,117 | Osdal | July 24, 1951 |
| 2,746,448 | Holmsten | May 22, 1956 |
| 2,797,680 | Nagel | July 2, 1957 |
| 2,841,132 | Philipp | July 1, 1958 |
| 3,008,601 | Cahne | Nov. 14, 1961 |
| 3,036,192 | Fry | May 22, 1962 |